US012358718B2

(12) United States Patent
Gary et al.

(10) Patent No.: US 12,358,718 B2
(45) Date of Patent: Jul. 15, 2025

(54) BODY TIE-DOWN

(71) Applicant: Oshkosh Corporation, Oshkosh, WI (US)

(72) Inventors: Logan Gary, Oshkosh, WI (US); Derek Wente, Austin, MN (US); Jacob Wallin, Oshkosh, WI (US); Jerrod Kappers, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 344 days.

(21) Appl. No.: 17/971,992

(22) Filed: Oct. 24, 2022

(65) Prior Publication Data

US 2023/0125077 A1 Apr. 27, 2023

Related U.S. Application Data

(60) Provisional application No. 63/271,442, filed on Oct. 25, 2021.

(51) Int. Cl.
*B65F 3/02* (2006.01)

(52) U.S. Cl.
CPC ........ *B65F 3/02* (2013.01); *B65F 2003/0269* (2013.01); *B65F 2003/0279* (2013.01)

(58) Field of Classification Search
CPC ................ B65F 3/02; B65F 2003/0269; B65F 2003/0279
USPC .......................... 296/35.1, 35.3, 190.01, 101
See application file for complete search history.

(56) References Cited

U.S. PATENT DOCUMENTS 4,149,608 A * 4/1979 Hennessey ........... B62D 33/067 296/35.1
4,862,983 A * 9/1989 Kreft ...................... B62D 27/04 180/89.13
5,538,274 A * 7/1996 Schmitz ................... B60G 7/02 280/124.135
7,503,553 B2 * 3/2009 Brannan ................... F16F 1/12 267/248
8,182,024 B2 * 5/2012 Hayes .................. B62D 33/067 296/190.07
8,430,426 B2 * 4/2013 Rasset ................ B62D 33/0604 296/190.07

(Continued)

FOREIGN PATENT DOCUMENTS

CN 109484497 A * 3/2019 ......... B62D 33/0604

*Primary Examiner* — Amy R Weisberg
*Assistant Examiner* — Veronica M Shull
(74) *Attorney, Agent, or Firm* — Foley & Lardner LLP

(57) ABSTRACT

A refuse vehicle includes a chassis having a chassis frame member, a refuse collection body having a body frame member, and a battery mounted to the chassis frame member, and a body tie-down assembly. The body tie-down assembly includes a chassis mounting member, a body mounting member, a spring assembly, and a retainer plate. The body mounting member has brackets that define a cavity and retaining slots. The top member of the chassis mounting member may be received within the cavity defined by the brackets. The spring assembly includes a spring, a bolt, and a nut. The retainer plate includes a slot. The bolt further extends through a top member of the chassis mounting member and the slot of the retainer plate and receives the nut. The bolt is received within the retaining slots during removal of the bolt to prohibit the bolt from coming in contact with the battery.

19 Claims, 12 Drawing Sheets

(56) References Cited

U.S. PATENT DOCUMENTS

| | | | | |
|---|---|---|---|---|
| 8,807,633 | B2 * | 8/2014 | Milburn | B62D 55/065 296/190.07 |
| 9,316,279 | B2 * | 4/2016 | Meisel | F16F 3/04 |
| 10,752,298 | B2 * | 8/2020 | Keller | B62D 33/0604 |
| 11,236,856 | B2 * | 2/2022 | Austin | G01G 23/02 |
| 2020/0346547 | A1 | 11/2020 | Rocholl et al. | |
| 2020/0346556 | A1 | 11/2020 | Rocholl et al. | |
| 2020/0346557 | A1 | 11/2020 | Rocholl et al. | |
| 2020/0346854 | A1 | 11/2020 | Rocholl et al. | |
| 2020/0346855 | A1 | 11/2020 | Rocholl et al. | |
| 2020/0346856 | A1 | 11/2020 | Rocholl et al. | |
| 2020/0346857 | A1 | 11/2020 | Rocholl et al. | |
| 2020/0346858 | A1 | 11/2020 | Buege et al. | |
| 2020/0346859 | A1 | 11/2020 | Buege et al. | |
| 2020/0346860 | A1 | 11/2020 | Buege et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0347661 | A1 | 11/2020 | Rocholl et al. | |
| 2020/0347857 | A1 | 11/2020 | Clifton et al. | |
| 2020/0398670 | A1 | 12/2020 | Rocholl et al. | |
| 2020/0398695 | A1 | 12/2020 | Rocholl et al. | |
| 2020/0398697 | A1 | 12/2020 | Rocholl et al. | |
| 2020/0399057 | A1 | 12/2020 | Rocholl et al. | |
| 2021/0031611 | A1 | 2/2021 | Yakes et al. | |
| 2021/0031612 | A1 | 2/2021 | Yakes et al. | |
| 2021/0221216 | A1 | 7/2021 | Yakes et al. | |
| 2021/0229908 | A1 | 7/2021 | Rocholl et al. | |
| 2021/0252995 | A1 | 8/2021 | Rocholl et al. | |
| 2021/0323436 | A1 | 10/2021 | Rocholl et al. | |
| 2021/0323437 | A1 | 10/2021 | Rocholl et al. | |
| 2021/0323438 | A1 | 10/2021 | Rocholl et al. | |
| 2021/0323763 | A1 | 10/2021 | Koga et al. | |
| 2021/0323764 | A1 | 10/2021 | Koga et al. | |
| 2021/0323765 | A1 | 10/2021 | Koga et al. | |
| 2021/0324880 | A1 | 10/2021 | Wente et al. | |
| 2021/0325529 | A1 | 10/2021 | Koga et al. | |
| 2021/0325911 | A1 | 10/2021 | Koga et al. | |
| 2021/0326550 | A1 | 10/2021 | Kappers et al. | |
| 2021/0327164 | A1 | 10/2021 | Koga et al. | |
| 2021/0339632 | A1 | 11/2021 | Rocholl et al. | |
| 2021/0339648 | A1 | 11/2021 | Koga et al. | |
| 2021/0345062 | A1 | 11/2021 | Koga et al. | |
| 2021/0373560 | A1 | 12/2021 | Koga et al. | |
| 2021/0396251 | A1 | 12/2021 | Clifton et al. | |
| 2022/0009338 | A1 | 1/2022 | Yakes et al. | |
| 2022/0033181 | A1 | 2/2022 | Koga et al. | |
| 2022/0096884 | A1 | 3/2022 | Koga et al. | |
| 2022/0097527 | A1 | 3/2022 | Koga et al. | |
| 2022/0097555 | A1 | 3/2022 | Koga et al. | |
| 2022/0097556 | A1 | 3/2022 | Koga et al. | |
| 2022/0097633 | A1 | 3/2022 | Koga et al. | |
| 2022/0097961 | A1 | 3/2022 | Koga et al. | |
| 2022/0097962 | A1 | 3/2022 | Koga et al. | |
| 2022/0097963 | A1 | 3/2022 | Koga et al. | |
| 2022/0097964 | A1 | 3/2022 | Koga et al. | |
| 2022/0099723 | A1 | 3/2022 | Koga et al. | |
| 2022/0105827 | A1 | 4/2022 | Rocholl et al. | |
| 2022/0106114 | A1 | 4/2022 | Buege et al. | |
| 2022/0106115 | A1 | 4/2022 | Buege et al. | |
| 2022/0156474 | A1 | 5/2022 | Kappers et al. | |
| 2022/0161854 | A1 | 5/2022 | Mortenson et al. | |
| 2022/0161997 | A1 | 5/2022 | Mortenson et al. | |
| 2022/0169444 | A1 | 6/2022 | Rocholl et al. | |
| 2022/0185582 | A1 | 6/2022 | Koga et al. | |
| 2022/0219896 | A1 | 7/2022 | Gary et al. | |
| 2022/0258965 | A1 | 8/2022 | Kappers et al. | |
| 2022/0258967 | A1 | 8/2022 | Kappers et al. | |
| 2022/0267090 | A1 | 8/2022 | Rocholl et al. | |
| 2022/0307312 | A1 | 9/2022 | Rocholl et al. | |
| 2022/0340359 | A1 | 10/2022 | Rocholl et al. | |
| 2022/0380123 | A1 | 12/2022 | Buege et al. | |
| 2023/0002152 | A1 | 1/2023 | Koga et al. | |
| 2023/0042649 | A1 | 2/2023 | Koga et al. | |
| 2023/0045720 | A1 | 2/2023 | Rocholl et al. | |

* cited by examiner

BODY TIE-DOWN

CROSS-REFERENCE TO RELATED PATENT APPLICATION

This application claims the benefit of and priority to U.S. Provisional Patent Application No. 63/271,442, filed Oct. 25, 2021, which is incorporated herein by reference in its entirety.

BACKGROUND

The present invention relates generally to chassis for commercial vehicles. More specifically, the present disclosure relates to securing a body of a commercial vehicle with a chassis of the commercial vehicle where the commercial vehicle may also include batteries mounted to the chassis.

The body of commercial vehicles, such as refuse vehicles, may be removable in order to permit the service of the chassis or body of the vehicle, or to permit one chassis to be used with multiple different bodies according to an operator's desire. However, the removal of the body from the chassis, whether for service or otherwise, can be a cumbersome and difficult process requiring removal of multiple components and use of multiple tools. This cumbersome process increases the risk that components will be misplaced or improperly installed, thereby increasing the likelihood of damage to the vehicle or injury to an operator. Commercial vehicles having batteries mounted to the chassis may be subject to space limitations that further exacerbate the difficulty in removing a vehicle body. There is a need for a device that improves the process of removing vehicle bodies from vehicle chassis, particularly on vehicles having batteries mounted to the chassis which are subject to space limitations.

SUMMARY

One exemplary embodiment relates to a refuse vehicle. The refuse vehicle includes a chassis having a chassis frame member, a refuse collection body having a body frame member, and a battery mounted to the chassis frame member, and a body tie-down assembly. The body tie-down assembly includes a chassis mounting member, a body mounting member, a spring assembly, and a retainer plate. The chassis mounting member has a top member defining at least one aperture. The chassis mounting member is coupled to the chassis frame member. The body mounting member has brackets that define a cavity and retaining slots. The body mounting member is coupled to the body frame member. The top member of the chassis mounting member may be received within the cavity defined by the brackets. The spring assembly includes a spring, a bolt, and a nut. The bolt extends through a spring cavity of the spring. The retainer plate includes a slot and a mounting surface. The mounting surface corresponds with the retaining slots of the brackets. The bolt further extends through the top member of the chassis mounting member and the slot of the retainer plate and receives the nut to secure the chassis mounting member to the body mounting member. The bolt is received within the one or more retaining slots during removal of the bolt to prohibit the bolt from coming in contact with the battery.

Another exemplary embodiment relates to a tie down. The tie down includes a chassis mounting member, a body mounting member, and a spring assembly. The chassis mounting member has a top member defining at least one aperture. The body mounting member includes brackets. The brackets defining a cavity and one or more retaining slots. The top member of the chassis member is received within the cavity. The spring assembly includes a spring having a spring cavity, a bolt, and a nut. The bolt extends through the spring cavity. The spring assembly is reconfigurable to modify a spring force applied between the body mounting member and the chassis mounting member. Rotation of the nut compresses the spring assembly in order to achieve a desired spring pre-tension to suspend a vehicle body relative to a vehicle frame. The bolt is received within the one or more retaining slots during removal of the bolt to prohibit the bolt from coming in contact with the body mounting member.

Another exemplary embodiment relates to a vehicle. The vehicle includes a chassis having a chassis frame member, a body having a body frame member, a battery mounted to the chassis frame member, and a body tie-down assembly. The body tie-down assembly includes a chassis mounting member coupled to the chassis frame member, a body mounting member coupled to the body frame member, a retainer plate, and a spacer. The retainer plate has a slot and a mounting surface. The mounting surface of the retainer plate corresponding to the retaining slots of the brackets. The spacer is positioned between the body mounting member and the retainer plate. The spacer is configured to define a clearance between the body mounting member and the retainer plate. Upon removal of a bolt positioned through the slot of the retainer plate, the bolt is positioned angularly within the clearance relative to prohibit the bolt from engaging the battery.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
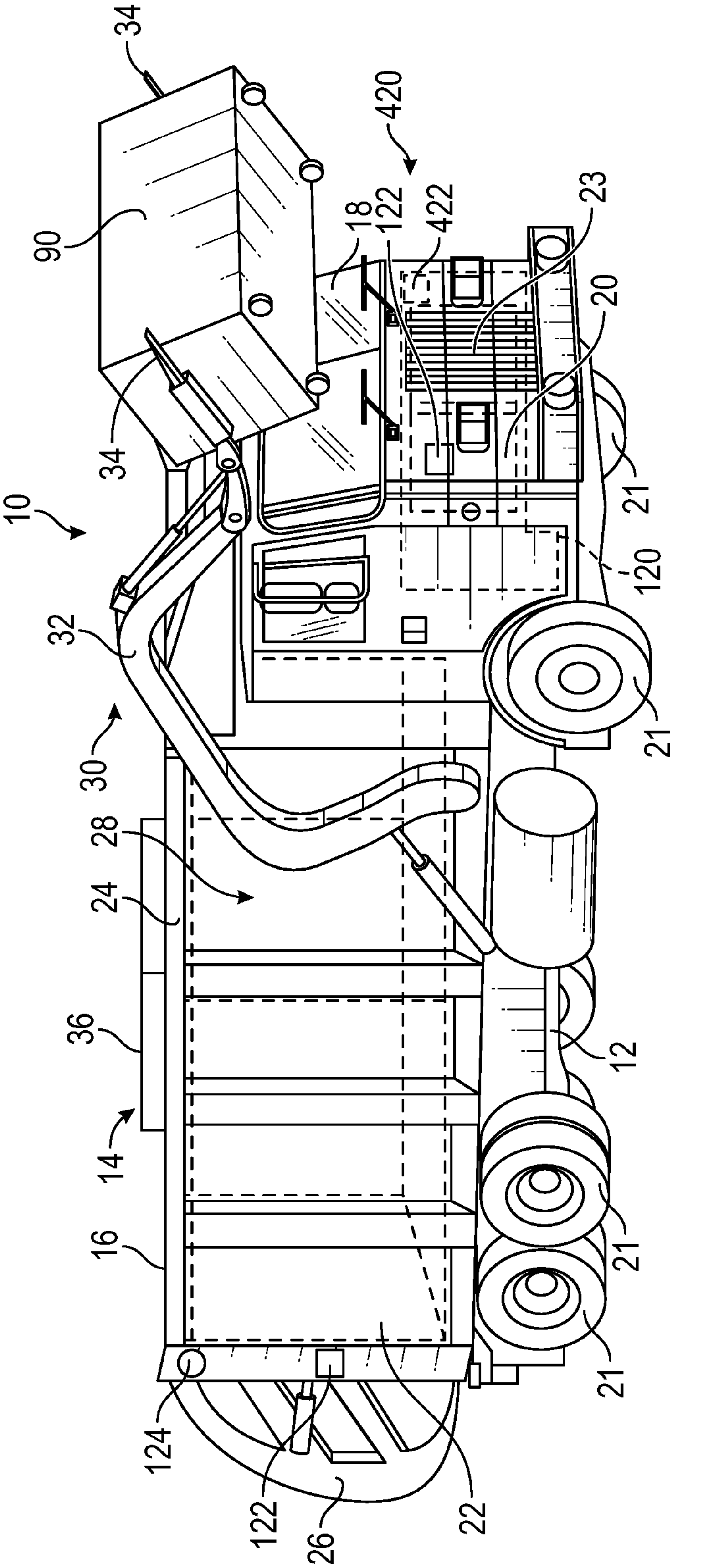
FIG. 1 is a perspective view of a front loading refuse vehicle according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

According to an exemplary embodiment, a body tie-down is used to non-rigidly attach a body to a chassis of a vehicle. Body tie-downs may be designed for a specific body and chassis combination and installation location along a longitudinal length of the body and chassis. The non-rigid coupling of a vehicle body to a chassis is advantageous because such non-rigid coupling facilitates the independent movement of the body relative to the chassis, thereby allowing the body to move or flex as the vehicle encounters various obstacles, such as pot holes, curves, etc. during ordinary use. This relative movement further protects the body, the frame, and the respective coupling of the body to the frame from damage.

The body tie-down of the present disclosure may facilitate the coupling of various vehicle bodies with various vehicle chassis. The vehicle body may vary by body type (e.g., refuse collector body, concrete mixer drum assembly, aircraft rescue and firefighting body, etc.), body width, and the position of a portion of the body tie-down along the longitudinal length of the body. The variability in the chassis may include chassis type, chassis width, and the position of a portion of the body tie-down along the longitudinal length of the chassis. The body tie-down facilitates the non-rigid coupling of multiple different bodies to multiple different chassis. Therefore, it is possible that a first vehicle body that is coupled to a first vehicle chassis may be replaced with a second vehicle body using the same body tie-down assembly or by sharing multiple components of the same body tie-down assembly. According to an exemplary embodiment, the body tie-down assembly of the present disclosure may be used to non-rigidly couple a refuse body to the chassis of an electrified refuse vehicle having one or more batteries coupled to said chassis. In such embodiments, the batteries coupled to the chassis impose space restrictions on the body tie-down assembly, thus creating a need for a body tie-down assembly adapted for use in a restricted envelope between the batteries and the chassis of the vehicle.

Likewise, the body tie-down may also improve the serviceability of a commercial vehicle upon which the body-tie down is installed. More specifically, the serviceability may be improved because, in one exemplary embodiment, there are no loose components (e.g., screws, bolts, nuts, springs, etc.), which may otherwise be lost as the body is detached from the chassis of the vehicle. In yet other exemplary embodiments, the body tie-down may include relatively few components, thereby facilitating the partial or complete removal of the body of the vehicle from the chassis of the vehicle, which offers several distinct advantages: (a) service of a commercial vehicle is simplified because use of relatively few tools is required; (b) service is made expedient because service requires removal of relatively few components; (c) the quality of service is improved by minimizing complexity of the service operation; and (d) safety is improved by minimizing the risk that service will be conducted in an improper or incomplete manner. Furthermore, the body tie-down may reduce the risk of over-compressing and under-compressing a spring assembly of the body tie-down during installation, repair, and/or maintenance on the vehicle, according to an exemplary embodiment.

Referring to FIGS. 1-6, a vehicle, shown as refuse vehicle 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse vehicle 10 by an operator (e.g., a seat, a steering wheel, hydraulic controls, etc.) as well as components that can execute commands automatically to control different subsystems within the vehicle (e.g., computers, controllers, processing units, etc.). The refuse vehicle 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 includes one or more electric motors coupled to the frame 12. The electric motor(s) may consume electrical power from an on-board energy storage device (e.g., one or more batteries 23, ultra-capacitors, hydraulic storage devices, etc.), from an on-board generator (e.g., an internal combustion engine and alternator), and/or from an external power source (e.g., overhead power lines, power rails, etc.) and provide power to the systems of the refuse vehicle 10. In some examples, the on-board energy storage device is a plurality of rechargeable lithium-ion battery cells.

According to an exemplary embodiment, the refuse vehicle 10 is configured to transport refuse from various waste receptacles within a municipality to a storage or processing facility (e.g., a landfill, an incineration facility, a recycling facility, etc.). As shown in FIGS. 1-4, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-4, the on-board receptacle 16 and collection chamber 28 are each positioned behind the cab 18. In some embodiments, the collection chamber 28 includes a hopper volume 52 and a storage volume. Refuse is initially loaded into the hopper volume 52 and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse vehicle 10). The refuse vehicle 10 can be arranged as a front-loading refuse vehicle (shown in FIGS. 1 and 3), a side-loading refuse vehicle (shown in FIG. 2), or a rear-loading refuse vehicle (shown in FIG. 4), for example.

Figure 3:
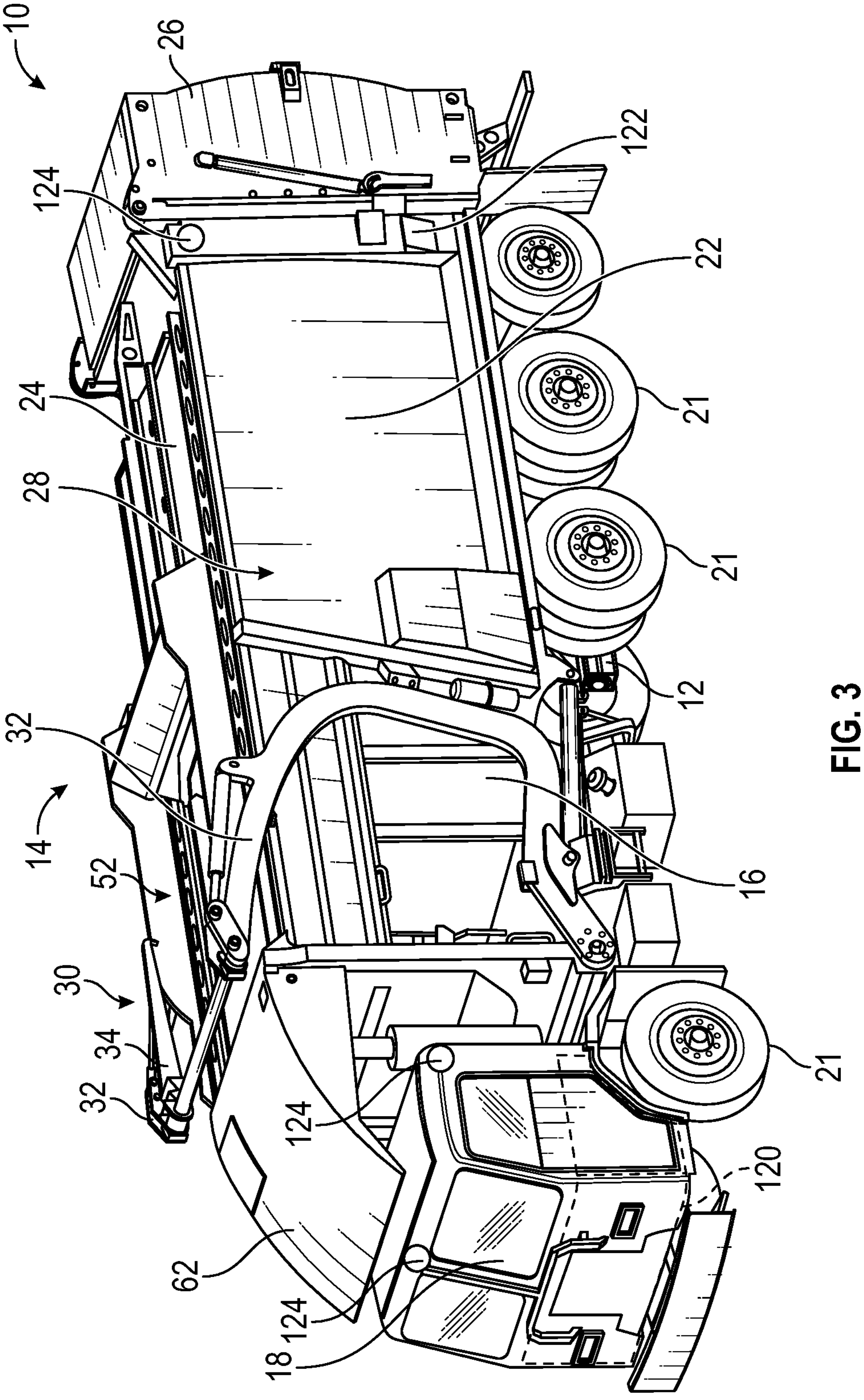
FIG. 3 is a front perspective view of an electric front loading refuse vehicle according to an exemplary embodiment.

Referring again to the exemplary embodiment shown in FIGS. 1 and 3, the refuse vehicle 10 is a front-loading refuse vehicle. As shown in FIG. 1, the refuse vehicle 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). As shown in FIG. 1, the arms 32 are rotated to lift the refuse container over the cab 18. Additional actuators (e.g., a hydraulic cylinder) can articulate the forks 34 to tip the refuse out of the container and into the hopper volume of the collection chamber 28 through an opening in the cover 24. The actuators thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Figure 2:
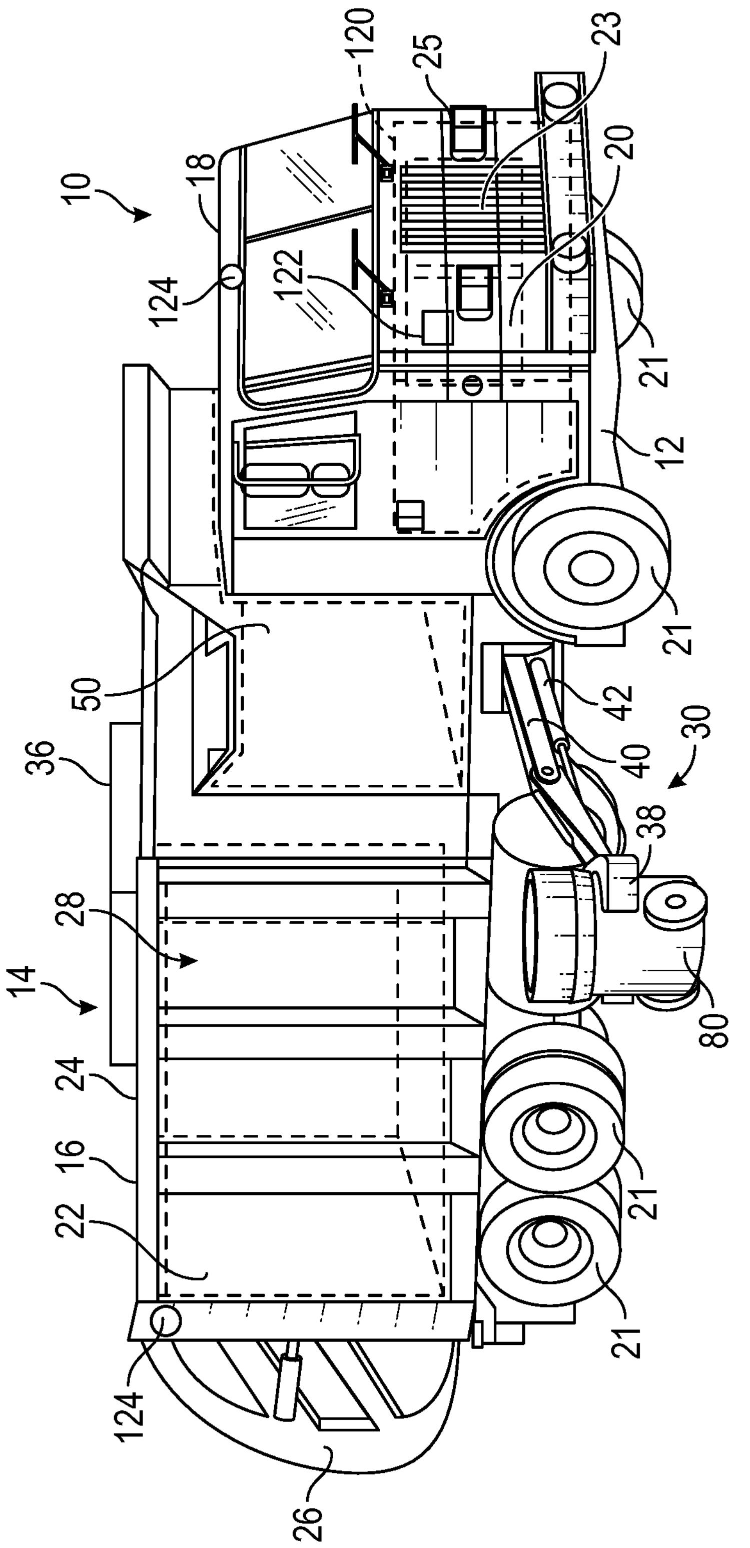
FIG. 2 is a perspective view of a side loading refuse vehicle according to an exemplary embodiment.

Referring to the exemplary embodiment shown in FIG. 2, the refuse vehicle 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Referring to FIG. 3, the refuse vehicle 10 is a front loading, fully electric E-refuse vehicle. Like the refuse vehicle 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). Additional actuators (e.g., hydraulic cylinders, linear actuators, etc.) articulate the forks 34 to tip the refuse out of the container and into the hopper volume of the collection chamber 28 through an opening in the cover 24. The actuators thereafter rotate the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIG. 3, the refuse vehicle 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor 20) rotates a transmission shaft, which in turn rotates the wheels 21 of the vehicle. The batteries 23 can supply electrical power to additional subsystems on the refuse vehicle 10, including additional electric motors, cab controls (e.g., climate controls, steering, lights, etc.), the lifting system 30, the compactor 50, and/or auxiliary systems 60, for example.

According to certain embodiments, the energy storage devices may include various other types of energy storage devices, such as hydraulic storage devices and/or capacitors. For example, the refuse vehicle 10 may include one or more hydraulic storage devices that are configured to store a pressurized fluid. When the hydraulic storage device releases some or all of the pressurized fluid, the fluid flow may be converted to another type of energy (e.g., electrical energy). According to various embodiments, the hydraulic storage devices may be in fluid communication with the hydraulics system. Further, the energy storage devices may include one or more capacitors that enable energy clipping. For example, if a motor or hydraulic storage device outputs more energy than is needed by the refuse vehicle, the capacitor may store that energy for use at a later time.

Figure 4:
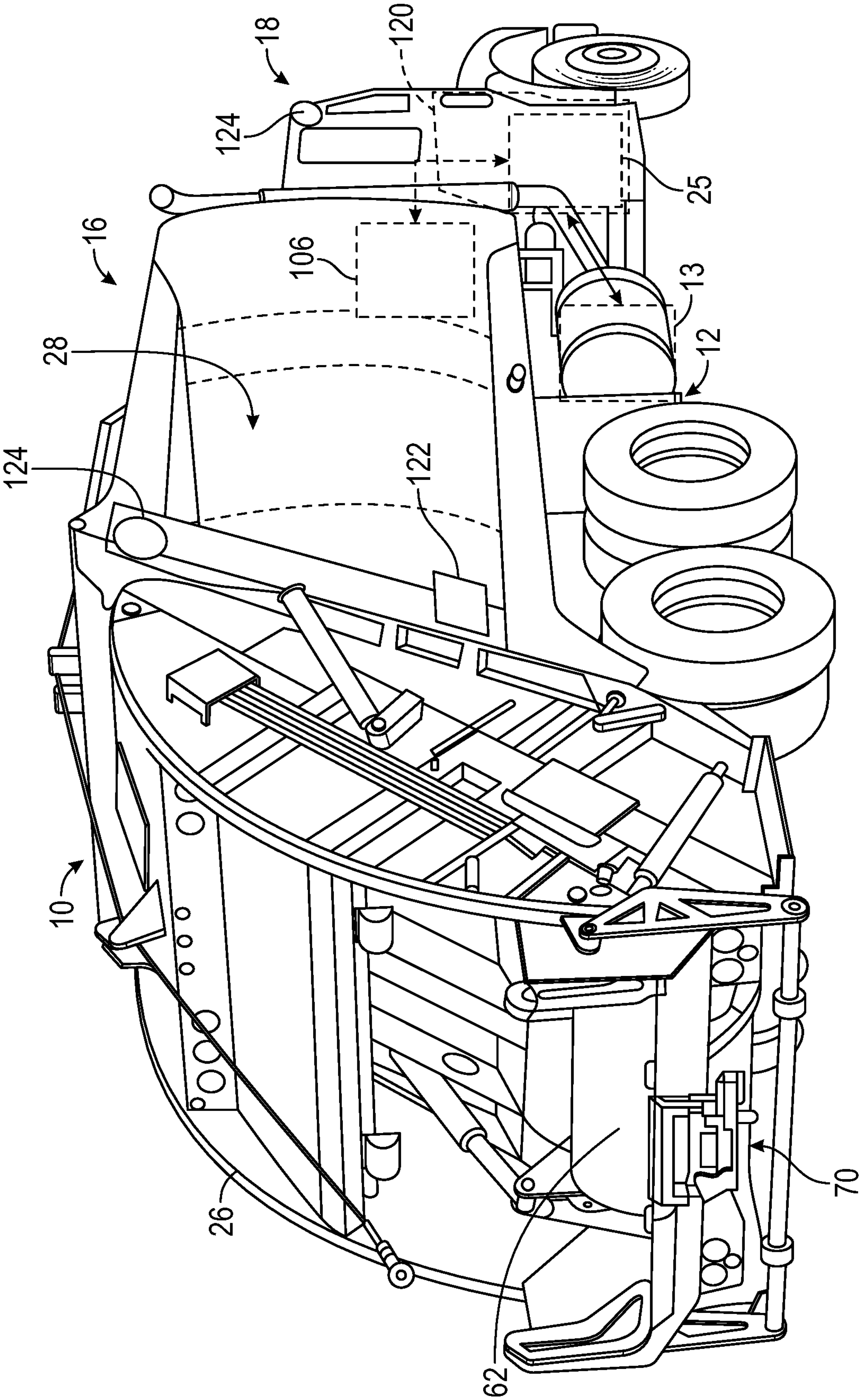
FIG. 4 is a rear perspective view of a rear loading refuse vehicle according to an exemplary embodiment.

Referring to FIG. 4, the refuse vehicle 10 can be a rear-loading refuse vehicle. Like the refuse vehicle 10 shown in FIGS. 1-3, the refuse vehicle 10 includes a frame 12 that supports a body assembly 14 formed of an on-board receptacle 16 and a cab 18. A tailgate 26 is movably positioned at a rear of the on-board receptacle 16 and defines a pathway into the collection chamber 28. In some examples, a refuse can tipper assembly 70 is positioned along the tailgate 26 to help invert refuse cans relative to the ground below so that refuse can be transferred from refuse cans into the tailgate 26. A packer 62 can pull refuse within the tailgate 26 upwardly and inwardly (e.g., forwardly) toward the collection chamber 28 for compaction.

The refuse vehicle 10 can be a hybrid refuse vehicle or an all-electric refuse vehicle, for example, with an electric frame or chassis 12. In hybrid refuse vehicles, the refuse vehicle can include both electric and hydraulic power systems. The frame 12 supports a primary battery 23 that is configured to supply electrical power to each of the prime mover 20, shown as an electric motor, and the various systems on the body assembly 14 of the refuse vehicle 10. A power distribution unit (PDU) 25 is in communication with the battery 23 and is configured to selectively monitor and supply electrical power from the battery 23 to each of the body assembly 14 and the prime mover 20. The PDU 25 can be a controller, processor, central processing unit (CPU), or other type of programmable or non-programmable device that monitors the battery 23 and the systems on the body assembly 14 and frame 12 that request electrical power from the battery 23. The PDU 25 is configured to control the supply of electrical power from the battery 23 to accommodate the power requests of the various systems on the frame 12 and body assembly 14 of the refuse vehicle 10. The PDU 25 monitors the battery 23 and controls contactors within the battery 23 to direct electrical power to the various systems within the refuse vehicle 10. In some examples, the PDU 25 prioritizes electrical power delivery through the refuse vehicle 10. The PDU 25 can ensure that critical functions (e.g., the prime mover 20, etc.) receive electrical power before auxiliary systems, like the E-PTO system 99, climate control systems, or radio, for example.

The refuse vehicle 10 further includes an E-PTO module 120 that at contains some or all of the E-PTO system 99 that is discussed further below. According to various embodiments, the E-PTO module 120 is removably coupled to the refuse vehicle 10 such that the E-PTO module 120 may be removed from the refuse vehicle 10. For example, the E-PTO module 120 may be a modular component of the refuse vehicle 10 that can be readily exchanged with another E-PTO module 120. In this sense, the E-PTO module 120 may be removed from the refuse vehicle (e.g., to perform maintenance) and a different E-PTO module 120 may be loaded into the refuse vehicle 10 to reduce downtime of the refuse vehicle 10.

As shown, the E-PTO module 120 is located proximate the front of the refuse vehicle 10, however, according to various embodiments, the E-PTO module 120 may be located elsewhere. For example, the E-PTO module 120 may also be located proximate the rear of the refuse vehicle 10.

According to various embodiments, the E-PTO module 120 includes a layer of sound insulating material (e.g., a layer of acoustic foam (e.g., studio foam), sound insulation (e.g., batts made of mineral wool, rock wool, fiberglass, etc.), acoustic panels, acoustic fabrics, acoustic coatings (e.g., Mass Loaded Vinyl), rubber material, composite material, metal, etc.). For example, some or all of the E-PTO module 120 includes a layer of sound insulating material. The sound insulating material is configured to reduce a perceived audible output from the E-PTO system 99. For example, according to various embodiments, the E-PTO module 120 contains the hydraulic pump 104 and the electric motor 102 of the E-PTO system 99. The hydraulic pump 104 and the electric motor 102 may produce high levels of noise pollution when in use. The sound insulation material may reduce the amount of noise pollution emitted from the E-PTO system 99 by absorbing some of the sound. Further, according to various embodiments, the sound insulating material may be flame resistant, thereby reducing the risk of fire within the E-PTO module 120.

As shown, the refuse vehicle 10 further includes one or more activation switches 122 that are accessible from the exterior of the refuse vehicle 10. For example, the refuse vehicle 10 may include an activation switch 122 proximate the front of the refuse vehicle 10 and/or an activation switch 122 proximate the rear of the refuse vehicle. Each activation switch 122 may enable an operator of the refuse vehicle 10 to input an external input, thereby causing the E-PTO system 99 to enter idle mode (e.g., as a part of process 610, discussed further below) or input a function request, thereby causing the E-PTO system to enter work mode (e.g., as a part of process 620, discussed further below). For example, the operator may trigger the activation switch 122 thereby causing the electric motor 102 and/or the hydraulic pump 104 to be activated. In this sense, the activation switches 122 enables the operator of the refuse vehicle 10 to increase pressure within the hydraulic system from outside of the refuse vehicle 10.

As shown, the refuse vehicle 10 includes one or more operator detectors 124 positioned about the refuse vehicle 10. The operator detectors 124 are configured to detect the presence of an operator outside of the refuse vehicle 10. For example, if an operator exits the cabin of the refuse vehicle 10 and approaches either the front of the rear of the refuse vehicle 10. The operator detectors 124 may include video cameras, motion sensors, proximity sensors, thermal sensors, and/or any other sensor configured to detect the presence of a person. Each operator detector 124 may enable an operator of the refuse vehicle 10 to automatically input an external input by approaching the front and/or the rear of the refuse vehicle 10, thereby causing the E-PTO system 99 to enter idle mode (e.g., as a part of process 610, discussed further below) or input a function request by approaching the front and/or the rear of the refuse vehicle, thereby causing the E-PTO system to enter work mode. For example, the operator may trigger the operator detector 124, thereby causing the electric motor 102 and/or the hydraulic pump 104 to be activated. In this sense, the operator detectors 124 enable the operator of the refuse vehicle 10 to automatically increase pressure within the hydraulic system from outside of the refuse vehicle 10 by approaching the front or rear of the vehicle.

Figure 5:
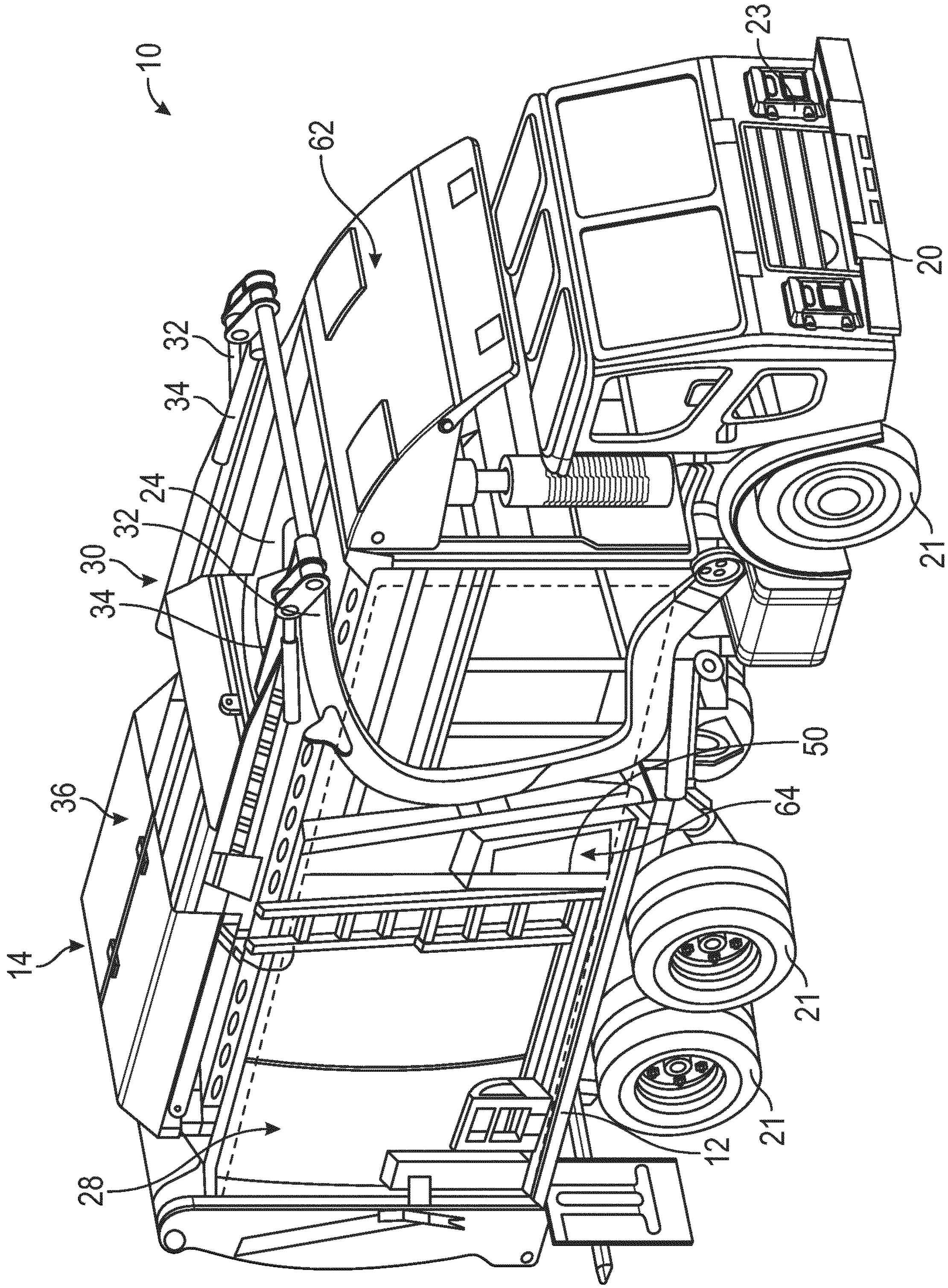
FIG. 5 is a front perspective view of an electric front loading refuse vehicle according to an exemplary embodiment.
Figure 6:
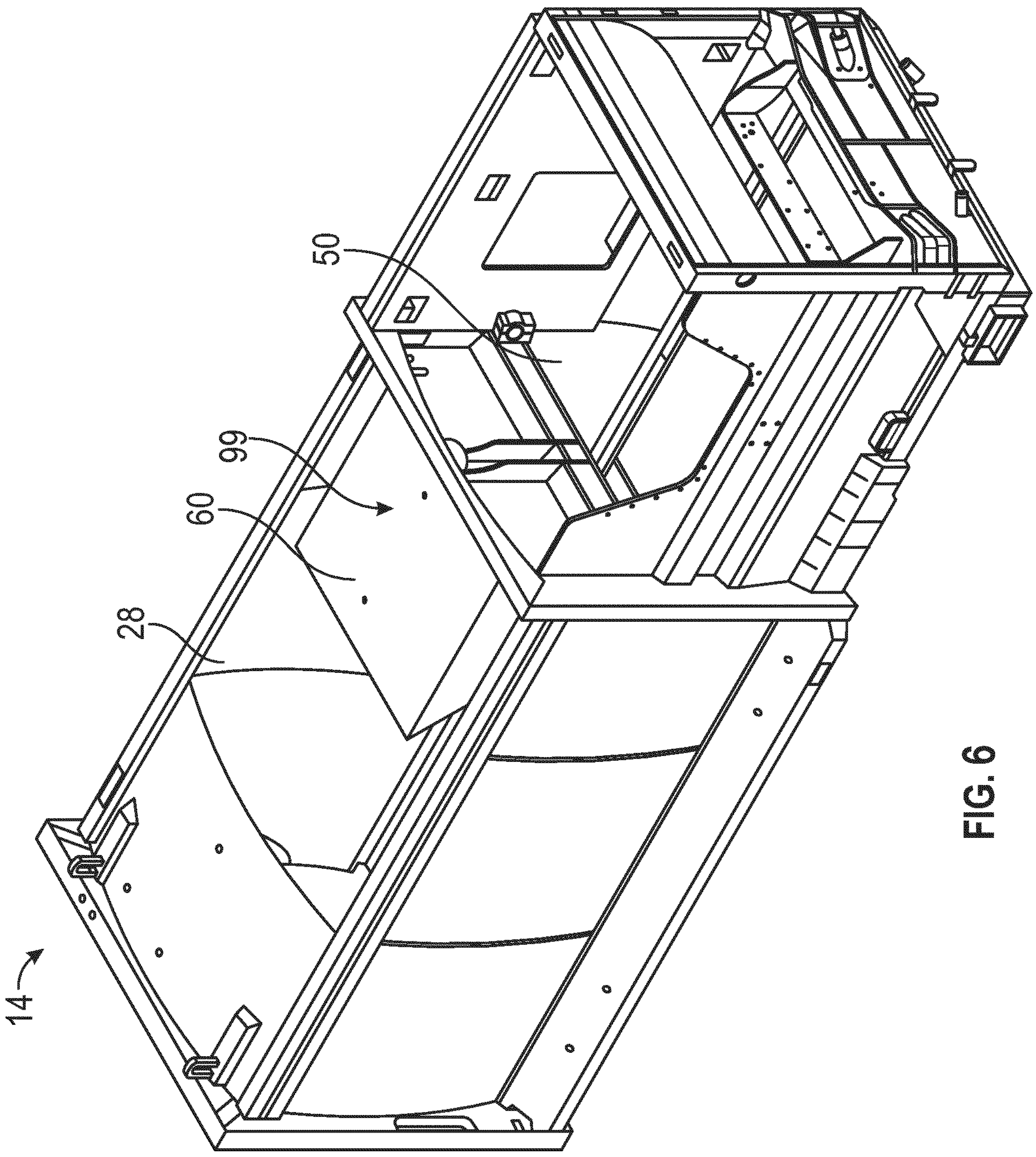
FIG. 6 is a top perspective view of a body assembly of the refuse vehicle of FIG. 3, according to an exemplary embodiment.

Referring to FIGS. 5 and 6, the refuse truck 10 is a front loading E-refuse vehicle. Like the refuse truck 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container 92, etc.). During operation of the refuse truck 10, the forks 34 are positioned to engage the refuse container (e.g., the refuse truck 10 is driven into position until the forks 34 protrude through the apertures within the refuse container). A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIG. 5, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse truck 10, including additional electric motors, cab controls (e.g., climate controls, steering, lights, etc.), the lifting system 30, and/or the compactor 50, for example.

The refuse truck 10 can be considered a hybrid refuse vehicle because it includes both electric and hydraulic power systems. The refuse truck 10 includes an E-PTO system 99. The E-PTO system 99 is configured to receive electrical power from the batteries 23 and convert the electrical power to hydraulic power. In some examples, the E-PTO system 99 includes an electric motor driving one or more hydraulic pumps 102. The hydraulic pump 102 pressurizes hydraulic fluid from a hydraulic fluid reservoir onboard the refuse truck 10, which can then be supplied to various hydraulic cylinders and actuators present on the refuse truck 10. For example, the hydraulic pump 102 can provide pressurized hydraulic fluid to each of the hydraulic cylinders within the lift system 30 on the refuse truck. Additionally or alternatively, the hydraulic pump 102 can provide pressurized hydraulic fluid to a hydraulic cylinder controlling the compactor 50. In still further embodiments, the hydraulic pump 102 provides pressurized hydraulic fluid to the hydraulic cylinders that control a position and orientation of the tailgate 26. The E-PTO system 99 can be positioned about the refuse truck 10 in various different places. For example, the E-PTO system 99 may be positioned within a housing 60 above or within the on-board receptacle 16, beneath a canopy 62 extending over a portion of the cab 18, or within a dedicated housing 64 alongside the vehicle body 14. Although the E-PTO system 99 may be in electrical communication with the batteries 23, the E-PTO system 99 can be separate from and spaced apart from the vehicle frame 12.

Figure 7:
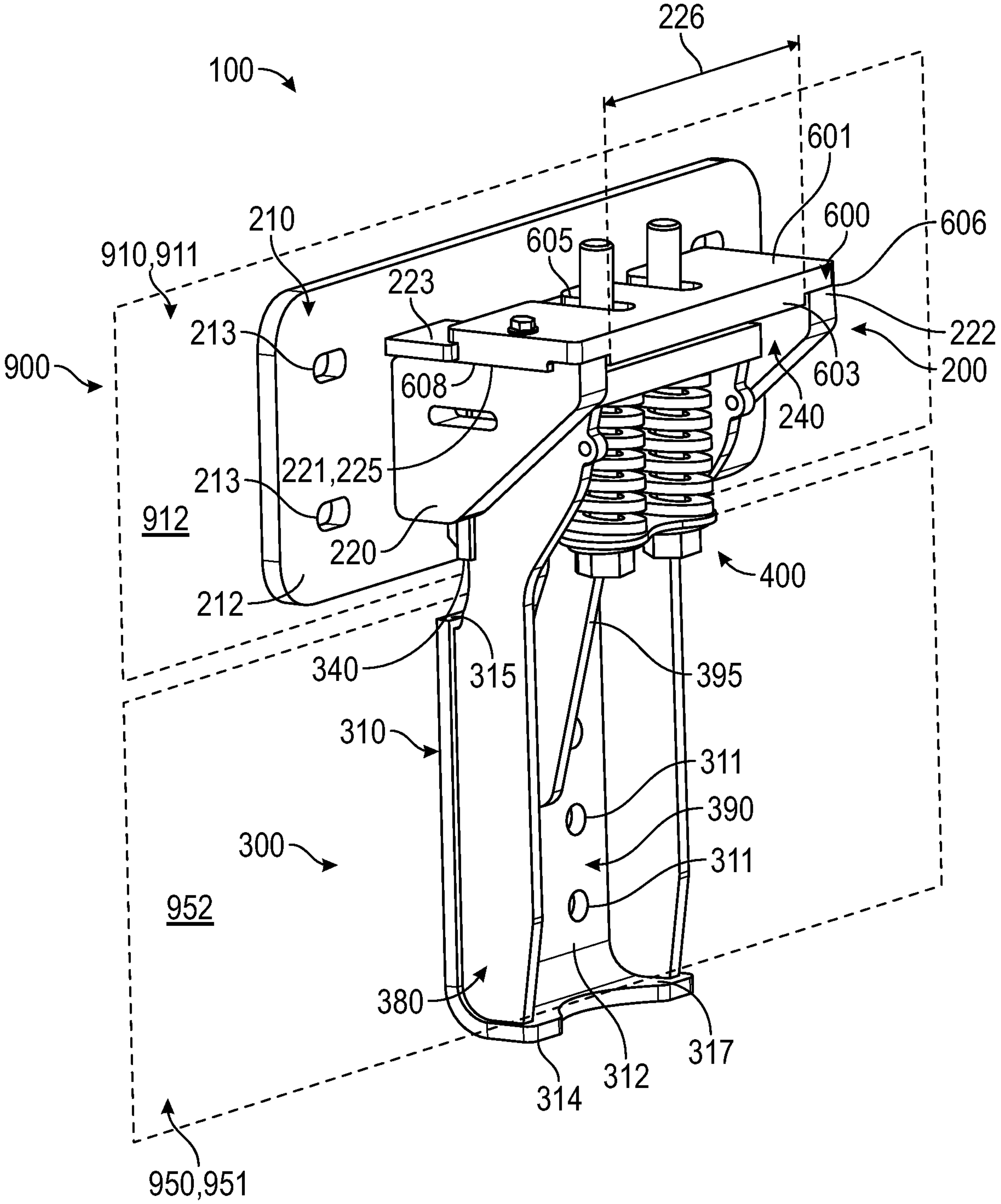
FIG. 7 is a perspective view of a body tie-down, according to an exemplary embodiment.

Referring to FIG. 7, a body tie-down assembly 100 is shown. According to an exemplary embodiment, the body tie-down assembly 100 may non-rigidly and detachably couple the body 910 of a vehicle 900 (e.g., similar to vehicle 10, etc.) to a chassis frame 950 of the vehicle 900. In some embodiments, the vehicle may be a commercial refuse truck, where the body 910 is a refuse container. In yet other embodiments, the vehicle may be a concrete truck, where the body 910 is a concrete mixing drum assembly, for example. In exemplary embodiments, the body 910 may be a refuse container and the chassis frame 950 may be to the chassis frame of an electrified refuse vehicle having one or more batteries coupled to the chassis frame 950.

In various applications, one or more body tie-down assemblies 100 may be used to couple the body 910 to the chassis frame 950. For example, four or more body tie-down assemblies 100 may be used to the body 910 to the chassis frame 950, where the body 910 is a refuse container. When multiple body tie-down assemblies 100 are used to couple the body 910 to the chassis frame 950, the weight of the body 910 may be evenly distributed along the chassis frame 950, which may be particularly advantageous in embodiments where the body 910 and/or the contents of the body 910 are heavy. In other embodiments, more or less than four (e.g., 2, 3, 6, etc.) body tie-down assemblies 100 may be used.

Figure 8:
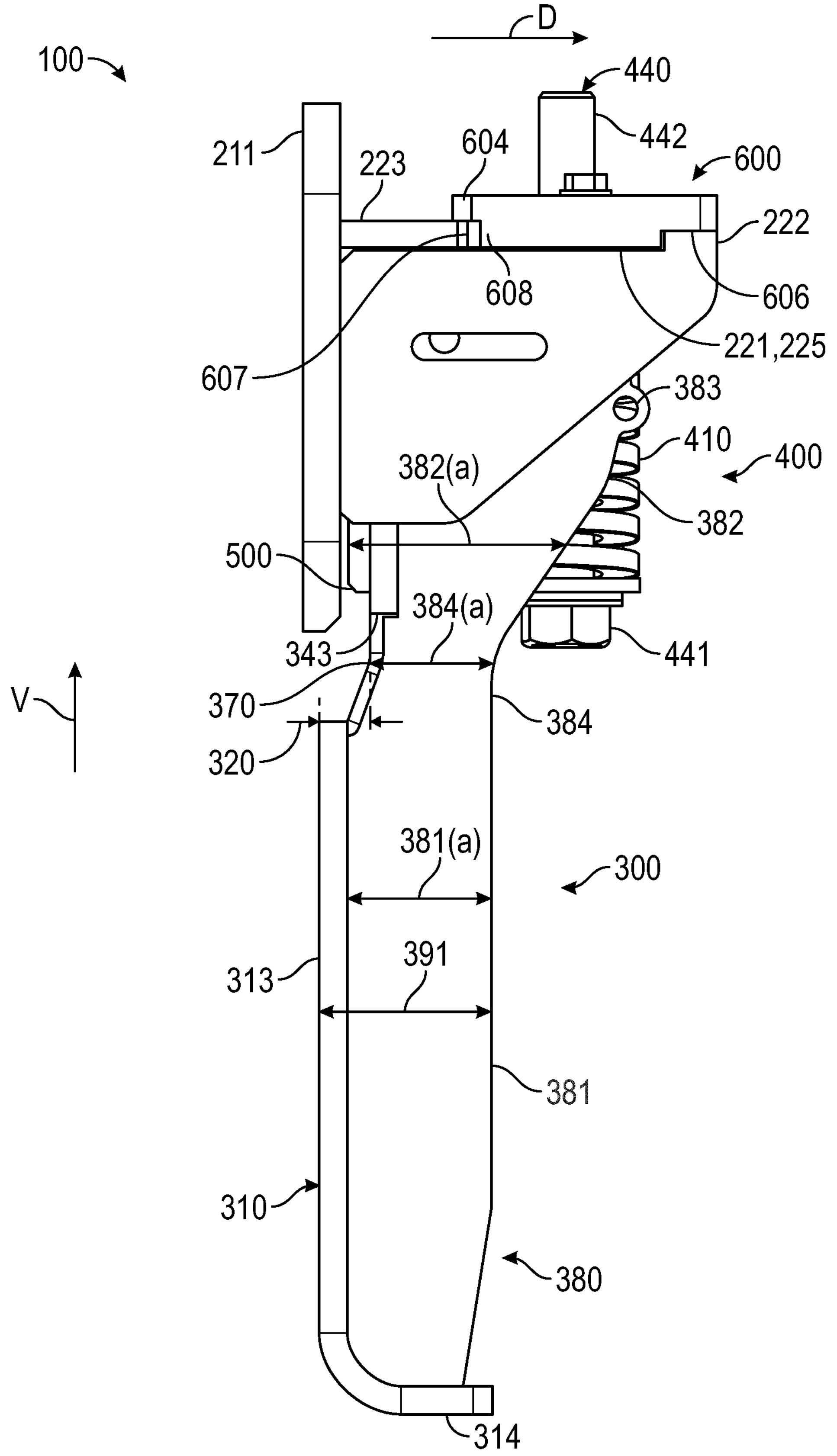
FIG. 8 is a side view of the body tie-down of FIG. 7, according to an exemplary embodiment.
Figure 9:
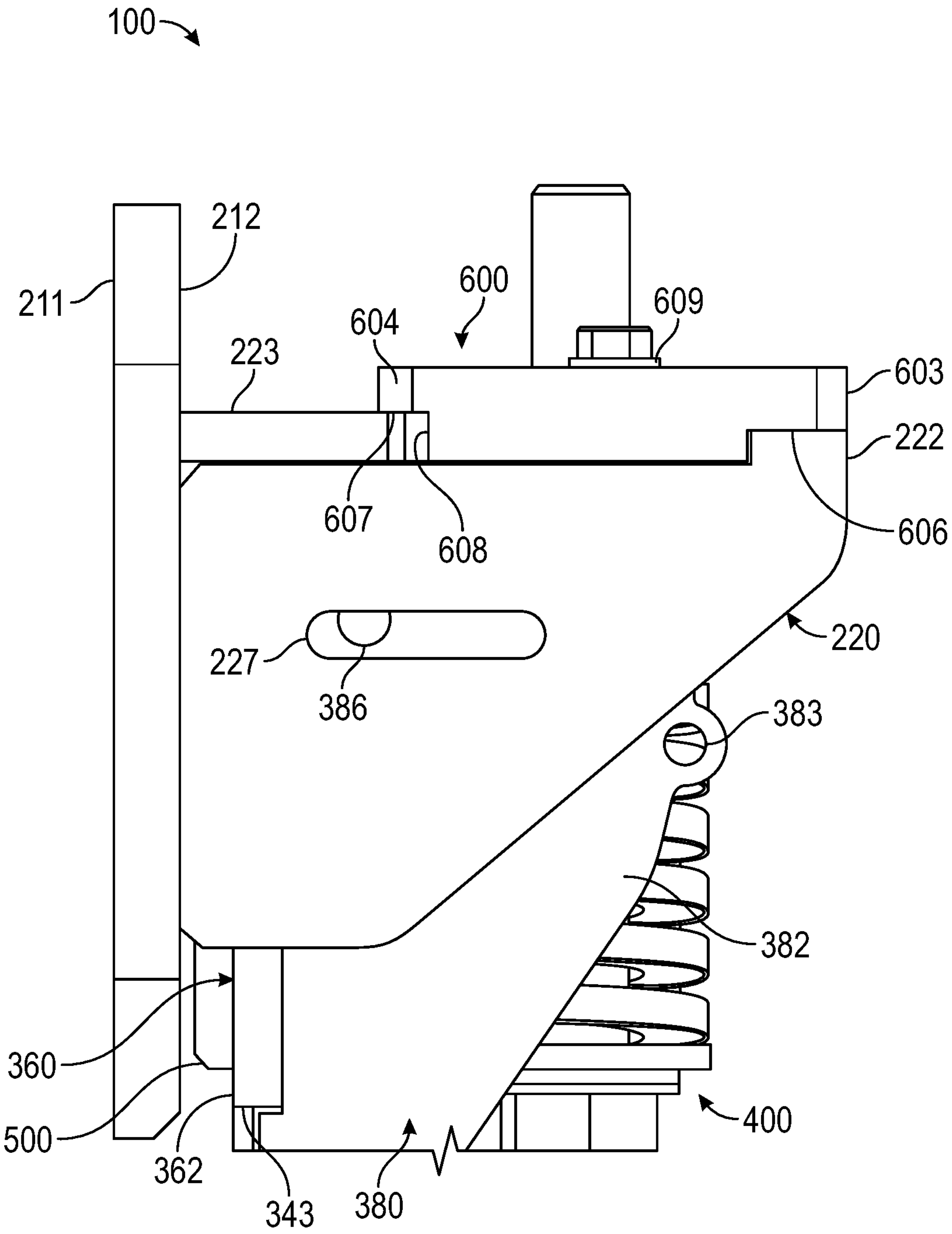
FIG. 9 is a side view of the body tie-down of FIG. 7, according to an exemplary embodiment.

Referring now to FIGS. 7-9, the body tie-down assembly 100 may include a body mounting assembly 200, a frame mounting assembly 300, and a spring assembly 400. The body mounting assembly 200 may couple to the body 910 of a vehicle 900, while the frame mounting assembly 300 may couple to the chassis frame 950 of the vehicle 900. According to an exemplary embodiment the body mounting assembly 200 may be non-rigidly and detachably coupled to the frame mounting assembly 300. Moreover, the spring assembly 400 may be coupled to both the body mounting assembly 200 and the frame mounting assembly 300, as shown in FIGS. 7-8. In some embodiments, the body tie-down assembly 100 may further include a wear plate 500 and a retainer plate 600.

As shown in FIG. 7, the body mounting assembly 200 may include a body mounting member 210. The body mounting member 210 includes a mating surface 211 and an opposing outer surface 212. The body mounting member 210 may further define a plurality of apertures 213. According to an exemplary embodiment, the apertures 213 of the body mounting member may correspond with a plurality of apertures defined by the body frame member 911. In this arrangement, a plurality of fasteners (e.g., bolts) may extend through the apertures 213 and the corresponding apertures of the body frame member 911. The body mounting member 210 may then be securely fastened to the body frame member 911 by additional, corresponding fasteners (e.g., nuts) such that the mating surface 211 abuts the body mounting surface 912. The mating surface 211 may be shaped or otherwise configured to be coupled to the body mounting surface 912. In one such embodiment, the body mounting member 210 may be welded to the body mounting surface 912.

As shown in FIG. 7, the body mounting assembly 200 includes a pair of brackets 220 that extend from a plate defining the outer surface 212 of the body mounting member 210. As shown in FIG. 8, the brackets 220 are spaced apart such that the body mounting member 210 selectively receives the frame mounting assembly 300. As shown in FIG. 7, the brackets 220 each define a cavity, shown as slot 221. The slot 221 is defined by and extends between a front extension 222, and a rear extension 223 (e.g., spacer). According to the exemplary embodiment shown in FIG. 7, each of the brackets 220 include a front extension 222, while the rear extension 223 is defined by a plate that extends between the pair of brackets 220. As shown in FIGS. 7-9, a mounting surface 225 and a window 227 are defined by each bracket 220.

As shown in FIGS. 7-10, the retainer plate 600 a top surface 601, bottom surface 602, a front edge 603, a rear edge 604, and a lanyard aperture 609. As shown in FIG. 7, the retainer plate 600 defines a pair of retainer slots 605. In one embodiment, the retainer slots 605 are configured to receive fasteners to removably couple the spring assembly 400 to the retainer plate 600, and to thereby couple the retainer plate 600 to the body mounting assembly 200, as described in detail below. In exemplary embodiments, the number of retainer slots 605 varies (e.g., one, three, etc.) to correspond with the number of fasteners of the spring assembly 400. As shown in FIG. 7, the retainer plate 600 defines front notches 606, which may be formed as a pair of cutouts. The front notches 606 are positioned at the corners of the front edge 603 and along the bottom surface 602, according to the exemplary embodiment shown in FIG. 7. The retainer plate 600 also defines rear notch 607, which may be formed as a cutout along the bottom surface 602 of the retainer plate 600 and extending the entire length of the rear edge 604 of said retainer plate 600.

As a consequence of the front notches 606 and the rear notch 607, the retainer plate 600 has an extension 608 positioned between the front notches 606 and the rear notch 607. As shown in FIGS. 7-10, the slots 221 of the brackets 220 are configured to receive the extension 608 of the retainer plate 600 such that the bottom surface 602 of the retainer plate 600 abuts the mounting surfaces 225 of the brackets 220 when the retainer plate 600 is coupled to the brackets 220, and thus coupled to the body mounting assembly 200. When the retainer plate 600 is coupled to the body mounting assembly 200, the front notches 606 of the retainer plate 600 receive the front extensions 222 of the brackets 220 and the rear notch 607 of the retainer plate 600 receives the rear extension 223 of the brackets 220. According to an exemplary embodiment, the extension 608, the front notches 606, and the rear notch 607 of the retainer plate 600 are positioned to correspond with the slot 221, the front extensions 222, and the rear extension 223 of the brackets 220. Interaction between the extension 608 and the front extensions 222 and the rear extension 223 may prevent lateral and longitudinal movement of the retainer plate 600 (e.g., away from the body frame member 911, etc.) when the retainer plate 600 is coupled to the body mounting assembly 200.

The brackets 220 are disposed parallelly from and separated from the other bracket 220 by a distance 226. When the retainer plate 600 is coupled to the brackets 220 of the body mounting assembly 200 as described above, the two brackets 220 and retainer plate 600 together define a frame coupling cavity 240. The frame coupling cavity 240 is adapted to receive a portion of the frame mounting assembly 300 in order to couple the frame mounting assembly 300 to the body mounting assembly 200, and thus to couple the body 910 of the vehicle 900 to the chassis frame 950 of the vehicle 900, as is described in detail below.

As depicted in FIG. 7-11, the frame mounting assembly 300 includes a frame mounting member 310, a body coupling member 340, a back plate 370, sidewalls 380, and a gusset 395. According to an exemplary embodiment, the frame mounting member 310 and the body coupling member 340 may be formed together as to comprise a unitary structure. Likewise, the sidewalls 380 may be coupled—such as by welding or some other coupling means—to the frame mounting member 310 and body coupling member 340 such that the frame mounting member 310, body coupling member 340, and sidewalls 380 together form a unitary structure. When so coupled, the frame mounting member 310, body coupling member 340, and sidewalls 380 form a cavity 390. Additionally or alternatively, the frame mounting assembly 300 may engage a battery. In such an embodiment, an edge of the sidewalls 380 may abut the battery to rigidly secure the battery (e.g., or a battery mount, etc.).

The frame mounting member defines a plurality of apertures 311, an inner surface 312, a mating surface 313, a bottom 314, a top 315, and a width 316. The frame mounting member 310 may be shaped or otherwise configured to couple to a frame mounting surface 952 of a chassis frame mounting member 951. For example, the apertures 311 of the frame mounting member 310 are configured to correspond with a plurality of apertures defined by the chassis frame mounting member 951. In such an embodiment, the mating surface 313 may abut the frame mounting surface 952 and a plurality of fasteners (e.g., bolts) may extend through the apertures 311 of the frame mounting member 310 and the corresponding apertures of the chassis frame mounting member 951. The frame mounting member 310 may then be securely coupled to the chassis frame mounting member 951 with additional, corresponding fasteners, such as nuts. In other embodiments, the frame mounting member 310 may be welded or otherwise secured to the chassis frame mounting member 951 such that the inner surface 312 of the frame mounting member 310 abuts the frame mounting surface 952 of the chassis frame mounting member 951.

Figure 10:
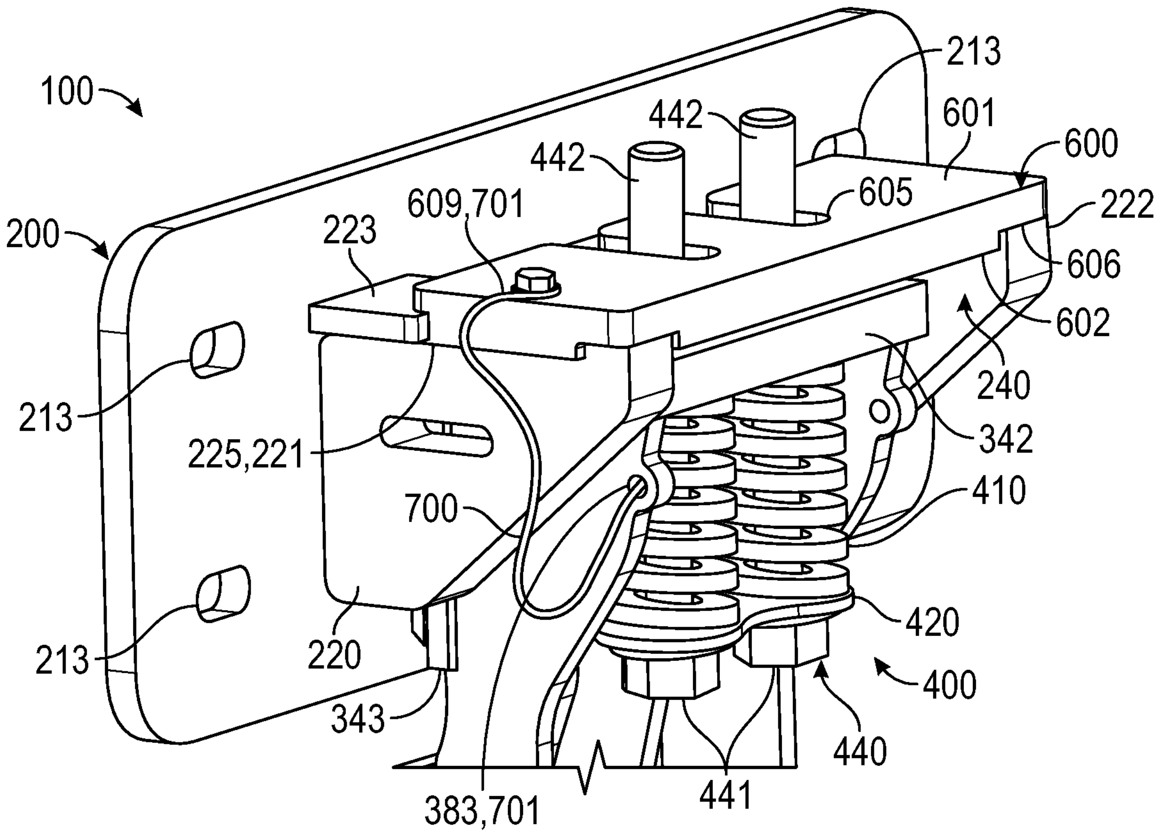
FIG. 10 is a perspective view of the body tie-down of FIG. 7, according to an exemplary embodiment.
Figure 11:
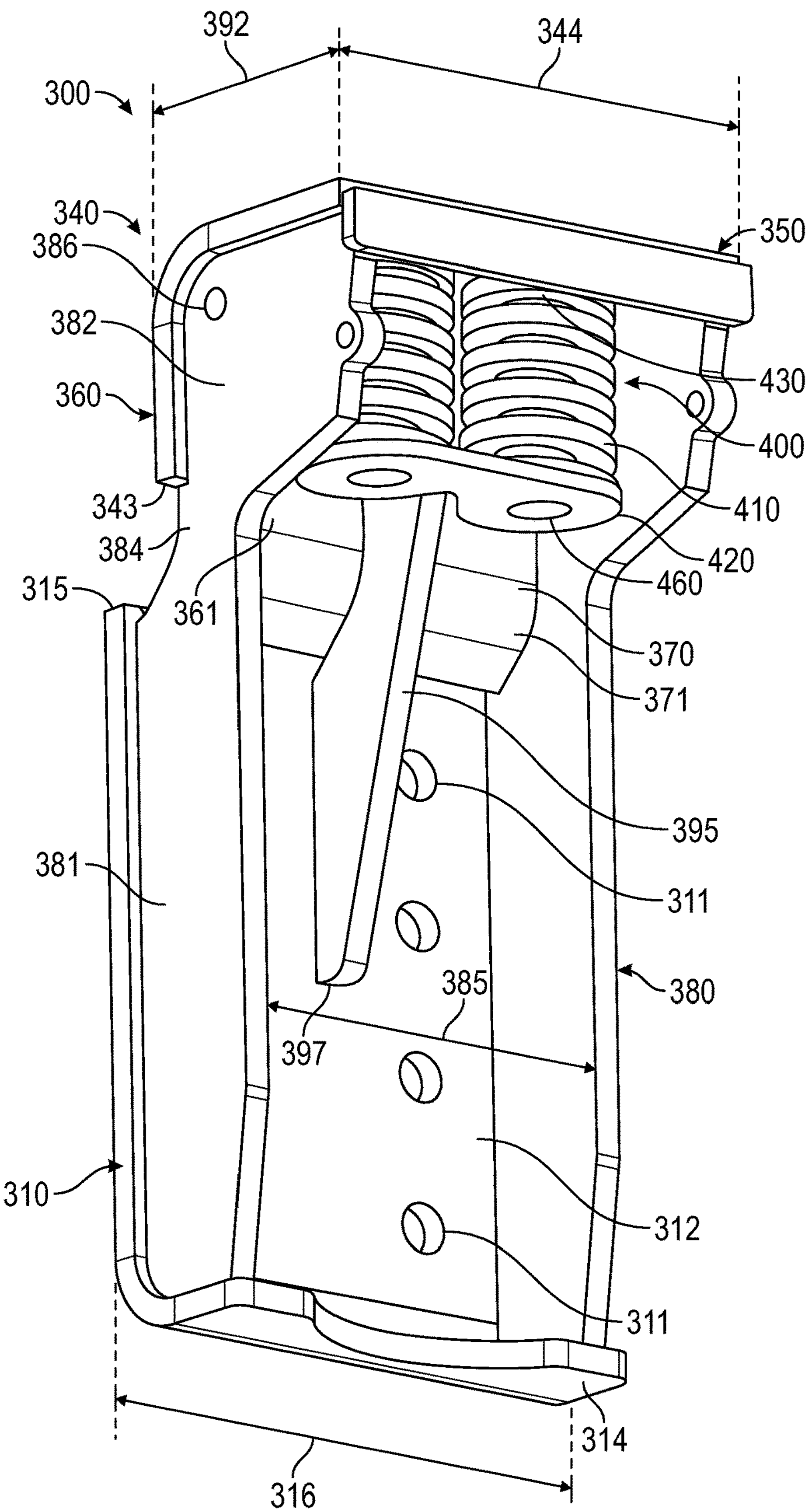
FIG. 11 is a perspective view of a frame mounting assembly and a portion of a spring assembly of the body tie-down assembly of FIG. 7, according to an exemplary embodiment.
Figure 12:
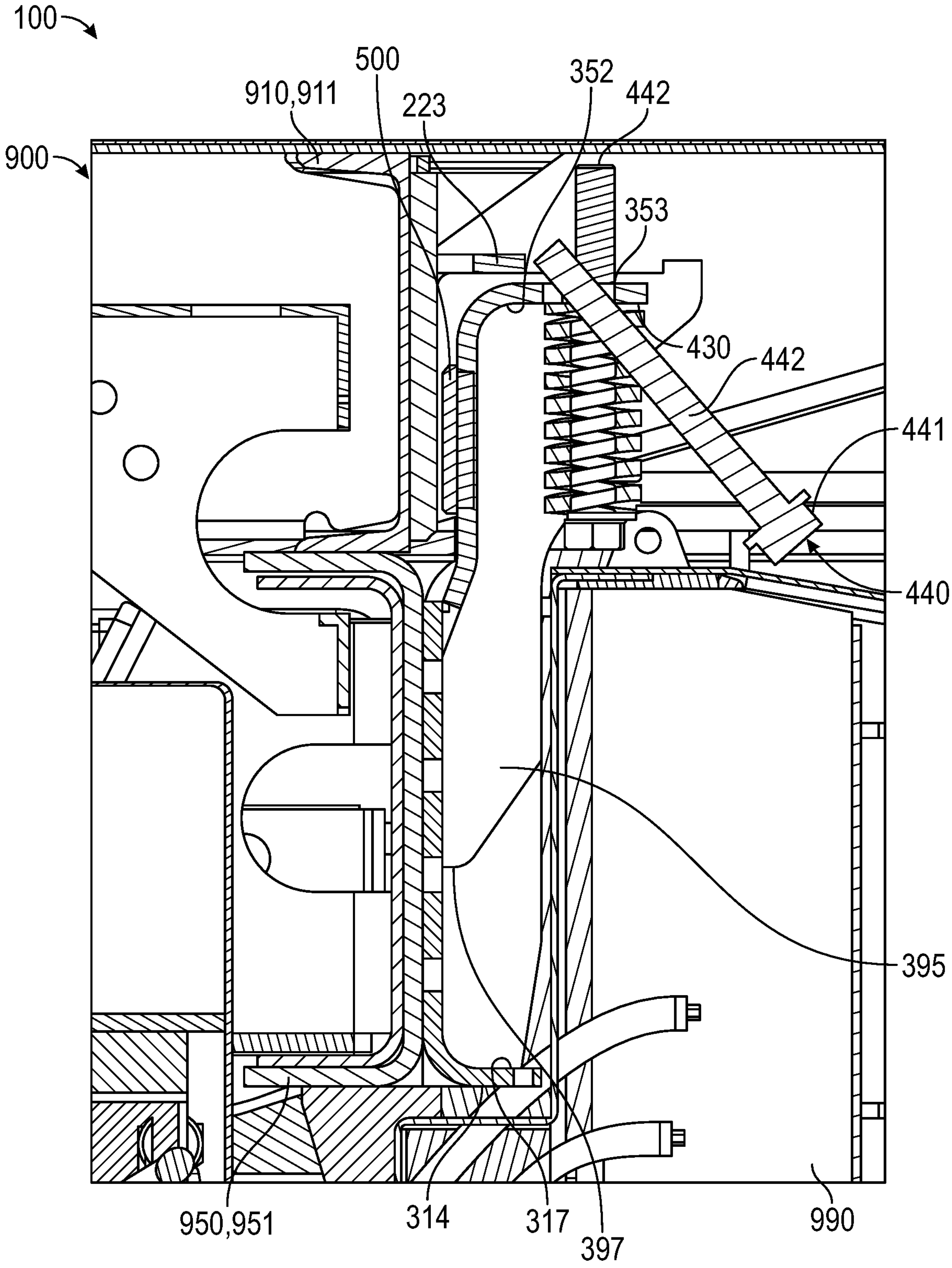
FIG. 12 is a perspective view of the body tie-down assembly of FIG. 7, according to an exemplary embodiment.

Referring now to FIGS. 10-12, the body coupling member 340 is shown. The body coupling member 340 may include a front surface 342, a bottom 343, a width 344, a top member 350, and a back member 360. According to an exemplary embodiment, the top member 350 may define bolt apertures 353. Furthermore, the top member 350 may include an outer surface and an inner surface. Likewise, the back member 360 may include an inner surface 361 and a mating surface 362. As is described further below, the bolt apertures 353 may be adapted to correspond to one or more bolts of the spring assembly 400. The back member 360 may be substantially perpendicular to the top member 350, while the front surface 342 may be substantially parallel to the back member 360. Similarly, the back member 360 may be disposed in a substantially parallel orientation to the body frame member 911 and chassis frame mounting member 951 of the vehicle 900 when the body tie-down assembly 100 is coupled to the vehicle 900. In exemplary embodiments the width 344 is less than the distance 226 of the body mounting assembly 200, which permits the frame coupling cavity 240 to receive the body coupling member 340.

According to an exemplary embodiment, the mating surface 313 of the frame mounting member 310 may be substantially parallel to but offset from the mating surface 362 of the back member 360 of the body coupling member 340. In particular, the mating surface 362 of the back member 360 may be offset a distance 320 in a direction D from the mating surface 313 of the frame mounting member 310. The back plate 370 is disposed between the frame mounting member 310 and the body coupling member 340. In exemplary embodiments, the back plate 370 extends from the top 315 of the frame mounting member 310 to the bottom 343 of the body coupling member 340. Because the mating surface 313 of the frame mounting member 310 is offset from the mating surface 362 of the back member 360, the back plate 370 extends at an angle, such as 20 degrees from a vertical direction V in from the top 315 to the bottom 343. The back plate 370 may extend at other angles (e.g., 30 degrees) in other embodiments. In exemplary embodiments, a back plate 370 that extends at an angle approximately 20 degrees from vertical direction V is preferable over an embodiment where a back plate 370 extends 30 degrees from vertical, for example, so that the structural integrity of the frame mounting assembly 300 may be increased, as is described further below.

The sidewalls 380 include a frame coupling portion 381, a body coupling portion 382, and a lanyard aperture 383 and a throat 384. The frame coupling portion 381 and the body coupling portion 382 may extend perpendicular from the inner surface 312 of the frame mounting member 310. The frame coupling portion 381 includes a thickness 381(*a*) from the inner surface 312 such that a total thickness 391 of the frame mounting member 310 and the frame coupling portion 381 of the sidewall 380 (i.e. the thickness of the frame mounting member 310 plus the thickness 381(*a*)) is approximately 2.5" (63.5 mm) or less, according to an exemplary embodiment. It is advantageous to maintain a total thickness 391 of approximately 2.5" (63.5 mm) in order to facilitate the use of the body tie-down assembly 100 on vehicles having a small space between the frame mounting surface 952 and some other component of the vehicle 900. In exemplary embodiments, the body tie-down assembly 100 may be installed on an electrified refuse vehicle having batteries 990 mounted to the chassis frame 950 such that the distance between the frame mounting surface 952 and the batteries 990 is approximately 2.5" (63.5 mm), as is shown in FIG. 12. In yet other embodiments, the body tie-down assembly 100 of the present invention may be installed on a vehicle 900 having fuel tanks or storage compartments mounted proximate to the frame mounting surface 952.

While maintaining a total thickness 391 of less than 2.5" (63.5 mm) may be important, particularly for vehicles having one or more batteries 990 mounted to the chassis, the thickness 382(*a*) of the body coupling member 340 may not be subject to such space constraints. Thus, in some embodiments, the total thickness 392, which includes the thickness 382(*a*) of the body coupling portion 382 and the thickness of the back member 360 of the body coupling member 340, may exceed 2.5" (63.5 mm). In other embodiments, the total thickness 392 may not exceed 2.5" (63.5 mm).

At least one of the sidewalls 380 may define the lanyard aperture 383. According to an exemplary embodiment, the lanyard aperture 383 may be formed opposite the back member 360 (i.e. proximate to the front surface 342). The lanyard aperture 383 may further be configured to couple to a lanyard 700. More specifically, the lanyard 700 may be a cord-like structure (e.g., braided steel cable, etc.) and may include two ends 701, where one end 701 is coupled to the sidewall 380 via the lanyard aperture 383, and the other end 701 is coupled to the retainer plate 600 via the lanyard aperture 609. Each of the lanyard apertures 383, 609 may be adapted to receive a fasteners (e.g., a bolt, washer, and nut). The ends 701 may be formed as an eye-hook or other circular connector such that the ends 701 may likewise receive a fastener. Thus, the fastener may extend through both an end 701 of the lanyard 700 and also through a lanyard aperture 383, 609 in order to couple the lanyard 700 to the frame mounting assembly 300 or retainer plate 600, respectively. When the lanyard 700 is coupled at one end 701 to the retainer plate 600 and at another end 701 to the frame mounting assembly 300, the retainer plate 600 is thereby coupled to the frame mounting assembly 300. Such coupling ensures that during service involving removal of the retainer plate 600 (e.g., when removing the body 910 from the chassis frame 950), the retainer plate 600 is not lost or misplaced, but instead remains tethered to the frame mounting assembly 300.

The throat 384 of the sidewall 380 includes a throat thickness 384(*a*). The throat 384 is a portion of the sidewall that extends between the frame coupling portion 381 and the body coupling portion 382. More specifically, the throat 384 is defined as the portion of the sidewall 380 between the bottom 343 of the body coupling member 340 and the top 315 of the frame mounting member 310. As discussed above, the back plate 370 of the frame mounting assembly 300 may extend from the top 315 of the frame mounting member 310 to the bottom 343 of the body coupling member 340 at an angle of, for example, approximately 20 degrees from vertical direction V. According to an exemplary embodiment, when the back plate 370 is oriented at an angle of 20 degrees from vertical direction V (rather than 45 degrees, for example), the thickness 384(*a*) may be increased, which may further bolster the structural integrity of the frame mounting assembly 300.

The sidewalls 380 are separated by a distance 385. According to an exemplary embodiment, the distance 385 may be less than the width 316 of the frame mounting member 310 and also less than the width 344 of the body coupling member 340. The distance 385 may less than the widths 316, 344, for example, in order to permit the sidewalls 380 to be mounted to the frame mounting member 310 and body coupling member 340 via welding where a welded seam is created both within the cavity 390 and outside of the cavity 390 in order to increase the rigidity and strength of the assembled frame mounting assembly 300.

Referring now to FIGS. 10-12, the gusset 395 includes a top, a bottom 397, and a height, and a thickness. The gusset 395 may be formed as a slender member disposed within the cavity 390 and may extend perpendicular from the inner surface 312 of the frame mounting member 310, an inner surface 371 of the back plate 370, and the inner surface 361 of the back member 360. Likewise, the top of the gusset 395 may be coupled to the inner surface of the top member 350. In this way, the gusset 395 may be mounted to each of the frame mounting member 310, the back plate 370, and body coupling member 340 in order to increase the structural rigidity of the frame mounting assembly 300, particularly when the frame mounting assembly 300 is under load. According to an exemplary embodiment, the height of the gusset 395 may be variable along a length of the gusset 395. For example, the height may be lesser at the bottom 397 of the gusset 395 than at the top. In exemplary embodiments, the height of the gusset 395 may vary according to the profile of the frame mounting assembly 300, namely to accommodate the offset distance 320, but also to conform to space constraints within the cavity 390, as is shown in FIGS. 10 and 12. The gusset 395 may extend from the inner surface of the top member 350 to an inner surface 317 of the bottom 314. Alternatively, the gusset 395 may extend from the inner surface 352 to some other position along the inner surface 312. According to an exemplary embodiment, the gusset 395 may be located equidistant from each sidewall 380 (i.e. located in the center of the cavity 390). In yet other embodiments, more than one gusset 395 may be used to further bolster structural integrity of the frame mounting assembly 300.

The body coupling member 340 of the frame mounting assembly 300 may be configured to slidably engage with the frame coupling cavity 240 of the body mounting assembly 200. More specifically, the body coupling member 340 may be accepted by the frame coupling cavity 240 such that the mating surface 362 of the back member 360 abuts or is proximate to the outer surface 212 of the body mounting member 210. Because the frame coupling cavity 240 is partially defined by the brackets 220, as noted above, the distance 226 separating the brackets 220 is greater than the width 344 of the body coupling member 340 such that the body coupling member 340 may be received between the brackets 220.

In some embodiments, the mating surface 362 may contact the outer surface 212 when the body coupling member 340 is received by the frame coupling cavity 240. However, in yet other embodiments, a space may exist between the outer surface 212 and mating surface 362 such that said outer surfaces 212 and mating surface 362 are not in contact. In these embodiments, any friction or wear between the body coupling member 340 and the body mounting member 210 is minimized. Alternatively, the wear plate 500 may be positioned between the mating surface 362 and the outer surface 212 such that any friction or wear caused by movement of the body coupling member 340 relative to the body mounting member 210 during ordinary use results in wear to the replaceable wear plate rather than damaging other components. According to an exemplary embodiment, the brackets 220 do not contact the body coupling member 340 when said body coupling member 340 is received by the frame coupling cavity 240.

While the wear plate 500 may advantageously prevent wear of various components, the wear plate 500 may also act as a spacer that may accommodate for any differences between the width of the body 910 and the width of the chassis frame 950. According to an exemplary embodiment, the wear plate 500 may have a thickness of approximately 0.31" (7.9 mm). In some embodiments, the wear plate 500 may be moveable within the frame coupling cavity 240, which allows an operator to adjust where the outer surfaces 212 and the mating surface 362 contact the wear plate 500 during use.

Referring now to FIGS. 10-12, the spring assembly 400 of the body tie-down assembly 100 is shown. The spring assembly includes springs 410, a bottom plate 420, an upper plate 430, bolts 440, and nuts. The number of bolts 440 included in the spring assembly 400 correspond with the number of springs 410. Likewise, one nut may be included for each bolt 440. According to an exemplary embodiment, the spring assembly 400 includes two springs 410, and thus two bolts 440 and two nuts.

The springs 410 may be coil springs defining a cylindrical spring cavity. The bolts 440 may include a head 441 having a head diameter and a threaded shank 442 having a shank diameter. As shown in FIG. 11, the springs 410 are captured by the bottom plate 420 and the upper plate 430. Both the bottom plate 420 and the upper plate 430 define one or more bolt apertures 460 corresponding to the number of springs 410. More specifically, each of the bolt apertures 460 may align with the spring cavity of one spring 410. The bolt apertures 460 and spring cavity may receive the shank 442 of a bolt 440. According to an exemplary embodiment, the shank 442 of the bolt 440 may be inserted first through the bolt aperture 460 of the bottom plate 420, then through the spring cavity, and finally through the bolt aperture 460 of the upper plate 430. In this configuration, the head 441 of the bolt 440 will be proximate to the bottom plate 420. Furthermore, the bolt aperture 460 of the bottom plate 420 may have a diameter that is greater than the shank diameter, but smaller than the head diameter. In this way, the bottom plate 420 may accept the shank 442 of the bolt 440 without allowing the head 441 of the bolt 440 to pass therethrough.

The shank 442 of the bolts 440 of the spring assembly 400 may extend through bolt apertures 353 defined by the top member 350 of the body coupling member 340. More specifically, the top member 350 may include bolt apertures 353 configured to receive the shank 442 of the bolt 440 when the spring assembly 400 is installed within the cavity 390 of the frame mounting assembly 300. The shank 442 of the bolts 440 may then be received by the retainer slots 605 of the retainer plate 600. According to an exemplary embodiment, the shank 442 of the bolts 440 extends beyond the top surface 601 of the retainer plate such that a threaded portion of the bolt 440 is exposed.

When nuts are fastened to the exposed threaded portion of the bolts 440, the bottom plate 420, springs 410, upper plate 430, top member 350, and the retainer plate 600 are coupled together between the head 441 of the bolt and the nut. Specifically, the head 441 of the bolt abuts the bottom plate 420, the bottom plate 420 then contacts the spring 410, the spring 410 then contacts the upper plate 430, the upper plate 430 then abuts the inner surface 352 of the top member 350, the outer surface of the top member 350 then abuts the bottom surface 602 of the retainer plate 600, and the top surface 601 of the retainer plate 600 then abuts the tightened nut. As the nuts are tightened, the springs 410 compress between the bottom plate 420 and the upper plate 430. Tightening the nuts thus increases or decreases the pre-tension on the springs 410. By tightening or loosening the nut, an operator may increase or decrease the pre-tension on the springs 410 to achieve an appropriate spring force for a particular application.

To facilitate the proper pre-tensioning of the springs 410 (i.e. to avoid over tensioning or under tensioning the springs 410), the brackets 220 may define windows 227. The windows 227 provide a visible indication that the springs 410 have been appropriately compressed or decompressed during the coupling of the body 910 to the chassis frame 950. More specifically, the window 227 may correspond to an indicator 386 of the sidewalls 380. The indicator 386 may be positioned on the sidewall 380 as to align with the window 227 when the springs 410 are properly pre-tensioned, as shown in FIG. 9.

The spring assembly 400 facilitates the coupling of the frame mounting assembly 300 to the body mounting assembly 200. As described above, the body coupling member 340 is slidably received within the frame coupling cavity 240. Once received within the frame coupling cavity 240, the body coupling member 340 may be coupled to the body mounting assembly 200 by securing the retainer plate 600 to the spring assembly 400 as described above. More specifically, the bolts 440 of the spring assembly 400 may be inserted through the retainer slots 605 and the nuts may then be secured to the bolts 440 and tightened as to apply pressure to the top surface 601 of the retainer plate. When the nuts are tightened on the bolts 440, the nuts compress the retainer plate 600 against the brackets 220 such that the retainer plate 600 is captured between the nuts and the brackets 220. When so captured, the extension 608 of the retainer plate 600 is corresponds to the mounting surface 225 of the brackets 220. Additionally, the front extensions 222 and the rear extension 223 of the brackets 220 correspond with the front notches 606 and the rear notch 607 of the retainer plate 600 to prevent undesired movement of the retainer plate 600. Because the spring assembly 400 is coupled to the frame mounting assembly 300, tightening the nuts to compress the retainer plate 600 against the brackets 220 in this fashion thus couples the frame mounting assembly 300 to the body mounting assembly 200.

In some embodiments, the spring assembly 400 may be only be coupled to the frame mounting assembly 300 when the bolts 440 are inserted through the bolt apertures 353 and subsequently fastened to the nuts, as described in the previous paragraph. However, in alternative embodiments, various components of the spring assembly 400 may be mounted to the frame mounting assembly 300 even when the bolts 440 and nuts are removed. For example, the upper plate 430 may be coupled to (e.g., welded, fastened, secured via retaining clips, etc.) to the inner surface 352 of the top member 350, such that the upper plate 430 is not a loose component when the bolts 440 and nuts are removed. In yet other embodiments, the upper plate 430 could also be mounted to the gusset 395. Minimizing the number of loose components may be a means to improve the serviceability of the body tie-down assembly 100.

To service a vehicle 900 that includes the body tie-down assembly 100 of the present invention, the body mounting assembly 200 must be separated from the frame mounting assembly 300. According to an exemplary embodiment, the body mounting assembly 200 and the frame mounting assembly 300 are coupled together via the spring assembly 400, namely by compression of the retainer plate 600 against the brackets 220 and body coupling member 340. Separation of the body mounting assembly 200 from the frame mounting assembly 300 can thus be achieved by loosening the nuts in order to decompress the springs 410. When the springs 410 are decompressed, the retainer plate 600 can be removed. When the retainer plate 600 is removed, the body mounting assembly 200 can be lifted from the frame mounting assembly 300, thereby decoupling the body 910 from the chassis frame 950. In exemplary embodiments, the nuts may be completely removed from the bolts 440 and the bolts 440 may then be removed from the spring assembly 400, as is depicted in FIG. 12. in addition to or in the alternative to removing the retainer plate 600.

Because the body tie-down assembly 100 may be installed on vehicles subject to space constraints imposed by batteries 990, fuel tanks, etc., the bolts 440 may need to be angled away from the body tie-down assembly 100 in order to be completely removed, as is depicted in FIG. 12. To facilitate the angling of the bolts 440 in this manner, the rear extension 223 of the brackets 220 may include a slot or recess to prevent the shank 442 of the bolt 440 from contacting the rear extension 223 during removal of the bolt 440. The rear extension 223 may define a clearance between the body coupling member 340 and the retainer plate 600 for which the bolt 440 may extend therein to prohibit the bolt 440 from engaging the battery upon removal.

With the bolts 440 and/or retainer plate 600 removed from, the body 910 can be lifted from the chassis frame 950, whether for service, replacement, or otherwise. Notably, the removal of the body 910 from the chassis frame 950 can be achieved by removal of relatively few parts or without creating any loose components that may be misplaced during service. For example, according to an exemplary embodiment where a lanyard 700 is used to couple the retainer plate 600 to the sidewall 380 of the frame mounting assembly 300, the body 910 may be removed by loosening the nuts such that the retainer plate 600 can be decoupled from the brackets 220 of the body mounting assembly 200. With the retainer plate removed, and even without the bolts 440 removed, the body 910 can be lifted from the chassis frame 950.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:

a chassis having a chassis frame member;

a refuse collection body having a body frame member;

a battery mounted to the chassis frame member; and a body tie-down assembly, comprising:

- a chassis mounting member having a top member defining at least one aperture, the chassis mounting member coupled to the chassis frame member;
- a body mounting member coupled to the body frame member, the body mounting member further comprising brackets, the brackets defining a cavity and one or more retaining slots, wherein the top member of the chassis mounting member is received within the cavity;
- a spring assembly comprising a spring having a spring cavity, a bolt, and a nut, wherein the bolt extends through the spring cavity; and a retainer plate having a slot and a mounting surface, the mounting surface of the retainer plate corresponding to the retaining slots of the brackets;

wherein the bolt further extends through the top member of the chassis mounting member and the slot of the retainer plate and receives the nut to secure the chassis mounting member to the body mounting member, and wherein the bolt is received within the one or more retaining slots during removal of the bolt to prohibit the bolt from coming in contact with the battery.

2. The refuse vehicle of claim 1, wherein the chassis mounting member includes a second cavity, a bottom member, and a gusset, the gusset mounted within the second cavity and extending from the top member towards the bottom member.

3. The refuse vehicle of claim 2, wherein the chassis mounting member is arranged between the chassis frame member and the battery.

4. The refuse vehicle of claim 3, wherein the chassis mounting member further comprises a sidewall extending vertically, the battery is engaged against an edge of the sidewall.

5. The refuse vehicle of claim 1, wherein the chassis mounting member is arranged between the battery and the chassis frame member.

6. The refuse vehicle of claim 1, wherein rotation of the nut in a clockwise or counterclockwise direction modifies a spring tension to adjust a spring force applied between the body mounting member and the chassis mounting member.

7. The refuse vehicle of claim 1, wherein the brackets comprise an aperture and an indicator positioned inward the aperture, wherein the spring assembly is repositionable between a tension position and a pre-tension position, and wherein the indicator is aligned with the aperture when the spring assembly is in the pre-tension position.

8. The refuse vehicle of claim 1, wherein rotation of the nut compresses the spring assembly in order to achieve a desired spring pre-tension to suspend the refuse collection body relative to the chassis.

9. The refuse vehicle of claim 1, wherein tightening of the nut on the bolt causes the retainer plate to interlock with the brackets of the body mounting member and the top member of the chassis mounting member.

10. A tie down, comprising:

a chassis mounting member having a top member defining at least one aperture;

a body mounting member comprising brackets, the brackets defining a cavity and one or more retaining slots, wherein the top member of the chassis mounting member is received within the cavity; and a spring assembly comprising a spring having a spring cavity, a bolt, and a nut, wherein the bolt extends through the spring cavity, the spring assembly reconfigurable to modify a spring force applied between the body mounting member and the chassis mounting member;

wherein rotation of the nut compresses the spring assembly in order to achieve a desired spring pre-tension to suspend a vehicle body relative to a vehicle frame, and wherein the bolt is received within the one or more retaining slots during removal of the bolt to prohibit the bolt from coming in contact with the body mounting member.

11. The tie down of claim 10, further comprising a retainer plate having a slot and a mounting surface, the mounting surface of the retainer plate corresponding to the retaining slots of the brackets.

12. The tie down of claim 11, wherein tightening of the nuts on the bolts causes a retainer plate to interlock with the brackets of the body mounting member and the top member of the frame mounting member.

13. The tie down of claim 11, wherein the bolt further extends through the top member of the chassis mounting member and the slot of the retainer plate and receives the nut to secure the chassis mounting member to the body mounting member.

14. The tie down of claim 10, wherein the brackets comprise an aperture and an indicator positioned inward the aperture, wherein the spring assembly is repositionable between a tension position and a pre-tension position, and wherein the indicator is aligned with the aperture when the spring assembly is in the pre-tension position.

15. The tie down of claim 10, wherein the chassis mounting member includes a cavity, a bottom member, and a gusset, the gusset mounted within the cavity and extending from a top member towards the bottom member.

16. The tie down of claim 15, wherein the chassis mounting member is coupled to a chassis frame member of a vehicle and arranged between the chassis frame member and a battery.

17. A vehicle comprising:

a chassis having a chassis frame member;

a body having a body frame member;

a battery mounted to the chassis frame member; and a body tie-down assembly, comprising:

a chassis mounting member coupled to the chassis frame member, the chassis mounting member comprising a sidewall extending vertically from the chassis mounting member, wherein an edge of the sidewall engages the battery;

a body mounting member coupled to the body frame member, the body mounting member further comprising brackets that define one or more retaining slots;

a retainer plate having a slot and a mounting surface, the mounting surface of the retainer plate corresponding to the retaining slots of the brackets; and a spacer positioned between the body mounting member and the retainer plate, the spacer configured to define a clearance between the body mounting member and the retainer plate;

wherein, upon removal of a bolt positioned through the slot of the retainer plate, the bolt is positioned angularly within the clearance relative to prohibit the bolt from engaging the battery.

18. The vehicle of claim 17, wherein the brackets comprise an aperture and an indicator positioned inward the aperture, wherein a spring assembly is repositionable between a tension position and a pre-tension position, and wherein the indicator is aligned with the aperture when the spring assembly is in the pre-tension position.

19. The vehicle of claim 17, wherein the chassis mounting member is arranged between the battery and the chassis frame member.

* * * * *